United States Patent [19]

Belcher

[11] Patent Number: 5,550,824
[45] Date of Patent: Aug. 27, 1996

[54] RF SIGNAL DISTRIBUTION SCHEME

[75] Inventor: Donald K. Belcher, W. Melbourne, Fla.

[73] Assignee: Harris Corporation, Melbourne, Fla.

[21] Appl. No.: 393,833

[22] Filed: Feb. 24, 1995

[51] Int. Cl.⁶ .................................................. H04J 1/00
[52] U.S. Cl. .............................. 370/71; 370/124; 455/3.1
[58] Field of Search .................................. 370/33, 34, 37,
370/38, 123, 71, 72, 73, 124; 455/3.1, 6.1,
6.3, 131, 132; 333/103, 116, 128, 100,
124, 125, 127, 136

[56]  References Cited

U.S. PATENT DOCUMENTS

| | | | |
|---|---|---|---|
| 4,445,048 | 4/1984 | Graham | 333/124 |
| 4,525,689 | 6/1985 | Wagner et al. | 333/104 |
| 4,955,020 | 9/1990 | Stone et al. | 455/3.1 |
| 5,058,198 | 10/1991 | Rocci et al. | 455/6.1 |
| 5,126,705 | 6/1992 | Carnevali et al. | 333/128 |
| 5,128,689 | 7/1992 | Wong et al. | 333/125 |
| 5,301,352 | 4/1994 | Nakagawa et al. | 455/132 |
| 5,450,395 | 9/1995 | Hostetter et al. | 370/18 |

Primary Examiner—Douglas W. Olms
Assistant Examiner—Min Jung
Attorney, Agent, or Firm—Rogers & Killeen

[57]  ABSTRACT

A system and method for distributing plural RF signals simultaneously to many receivers. Instead of directly connecting all of the receivers by conventional cabling to the RF signals, a bus system is used. RF signals are distributed to one or more chassis each of which has one or more busses to carry each of the RF signals. Receivers may be physically and electrically removably attached to the chassis.

20 Claims, 5 Drawing Sheets

RF SIGNAL DISTRIBUTION SCHEME

BACKGROUND OF THE INVENTION

The invention is related generally to systems and methods for distributing RF signals and in particular to systems and methods for distributing one or more RF signals to plural receivers.

Modern communication systems often involve multiple antennas which feed RF signals to plural receivers. For example, as disclosed in co-pending application Ser. No.08/393,832 ("Frequency Switching Using RF Buss"), filed on the same day as the present application and of which this inventor is one of the co-inventors, in one telephone communication system, the RF signals from three antennas may be fed to many receivers so that various telephone conversations may be independently decoded and applied to a terrestrial telephone network. With reference to FIG. 1, in a prior art system, it is known to separately connect each feed from each of the antennas to each of the receivers. Such an arrangement provides all the required signals to the receivers so that the receivers may select any sub-signal from within the plural RF signals but at a cost of many power splitters and a large quantity of RF signal cabling. For example, in one proposed system, six antenna feed a rack of 96 receivers. In a conventional signal distribution system, 576 separate runs of coaxial cable and many power splitters would be required to distribute the signals to the receiver.

Considerable cost and complexity could be avoided if the RF signals could provided to plural receivers without the necessity of many splitters and massive cabling. It is known in the prior art to bus electrical signals among plural devices which communicate or interconnect via the bus. Busses, however, are generally not usable for RF signals because of the tendency of RF signals to exhibit standing waves and reflections resulting from mismatched impedance. The attachment of receiving or similar devices to an RF signal buss significantly alters the loading and impedance on the bus and may thereby adversely affect signal propagation on the bus.

It is also known in the prior art to distribute signals (including power, ground, and communications) to various devices in a rack or chassis of similar devices wherein the devices are contained on printed circuit boards which may be selectively attached to or removed from the rack as needed to handle the workload applied to the rack. In such racks, often a motherboard busses around various signals which are electrically connected to circuits on daughterboards when the daughterboards are physically (and removably) attached to the mother board of the rack or chassis. While such motherboard/daughterboard systems are common in many electrical systems, they are not generally found in RF signal distribution systems for the same reasons as given above. Additionally, if the number of daughterboards attached to the motherboard at one time is variable (i.e., the daughterboards may be removed or added as communications load change), the effects of the presence/absence of daughterboards on the RF bus may significantly degrade the RF signals being bussed.

Accordingly, it is an object of the present invention to provide a system and method which obviates these and other known difficulties in the prior art.

It is another object of the present invention to provide a novel system and method in which RF signals from one or more antennas can be provided to plural receivers without a requirement to separately connect each antenna feed to each receiver in a matched RF distribution fashion.

It is still another object of the present invention to provide a novel system and method in which RF signals may be bussed to one or more receiving devices where the number of receiving devices is not predetermined.

It is yet another object of the present invention to provide a novel system and method for attaching signal receiving devices to a RF signal bus.

It is a further object of the present invention to provide a novel system and method of interconnecting one or more daughterboards to a motherboard without substantially adversely affecting a RF signal being connected between the boards.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 2:
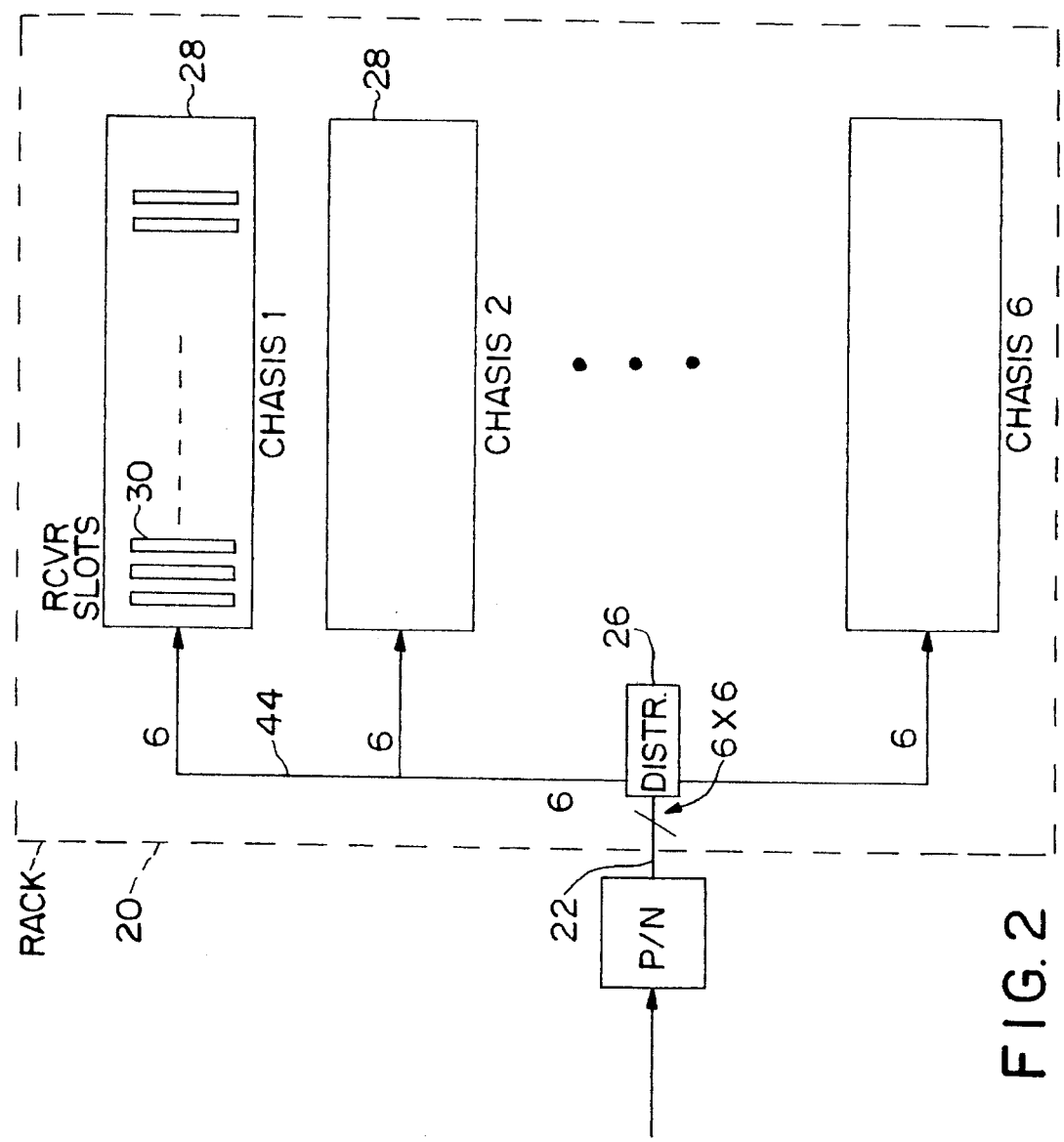
FIG. 2 is a partial functional block diagram of an RF signal distribution system of the present invention.

With reference to FIG. 2, a system in accordance with the present invention may be embodied within an RF signal distribution apparatus in which, for example, six RF signals 22 are made available to an electronic equipment rack 20. The RF signals 22 may be derived from any conventional source, such as another communicating device, one or more antennas, etc. The RF signals may be received by a rack-to-chassis distribution device 26 which splits each of the incoming RF signals 22 into plural copies of the incoming signals. For example, in the system of FIG. 2, the distribution device 26 splits each of the incoming six RF signals into six copies of the signal. Each of the copied signals may be provided by conventional means to each of the chassis 28 mounted within the rack 20. As described more fully below, each of the copied RF signals is made available to the plural receiver boards within each chassis 28 for use by the receiver circuits contained on each of the receiver boards 30. Each chassis 28 may contain an arbitrary number of receiver boards 30; for purposes of illustration and comparison with the prior art (but without limitation), the system of FIG. 2 may include sixteen receiver boards.

Figure 1:
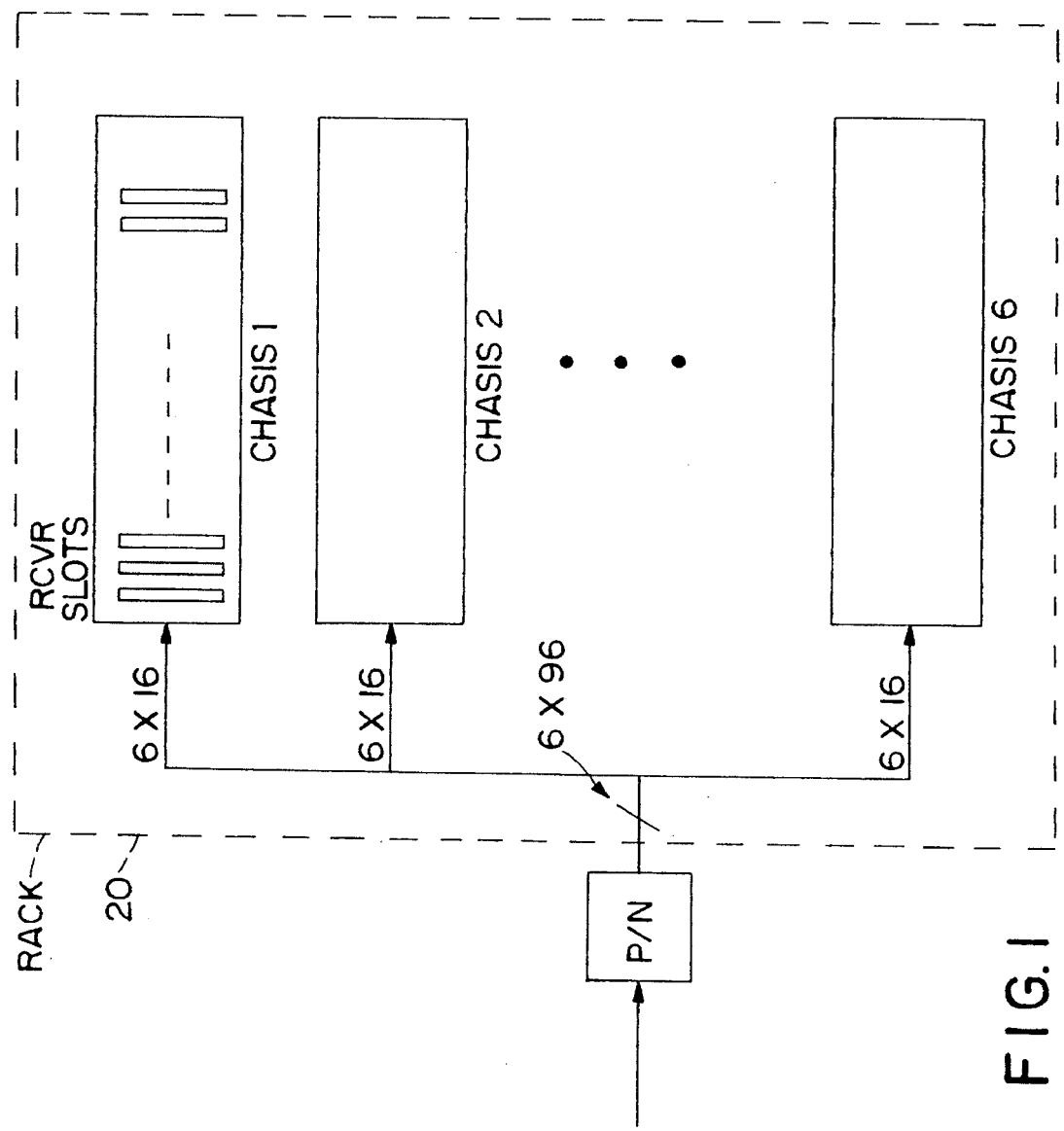
FIG. 1 is a representative pictorial diagram of a prior art RF signal distribution system.

In operation, the RF signals 22 input to the rack 20 are split and provided to each of the chassis 28. Note that in contrast to the prior art systems such as that illustrated in FIG. 1, in the system of the present invention only one cable for each RF signal travels between the distribution device 26 and the chassis 28. To connect the entire rack, only 36 cables are needed (six cables for each of the six racks) in the present system as opposed to the 576 cables needed to interconnect a like number of receivers in the system of FIG. 1.

The operation of a system of the present invention is not limited to signals which are strictly within the RF band but the system will provide benefits to the distribution of signals of other bands. For example, for purposes of this application, the RF signals may include "intermediate frequency" ("IF") signals or other signals having sufficiently high frequency that they are desirably transmitted by transmission lines, waveguides or the like.

Figure 3:
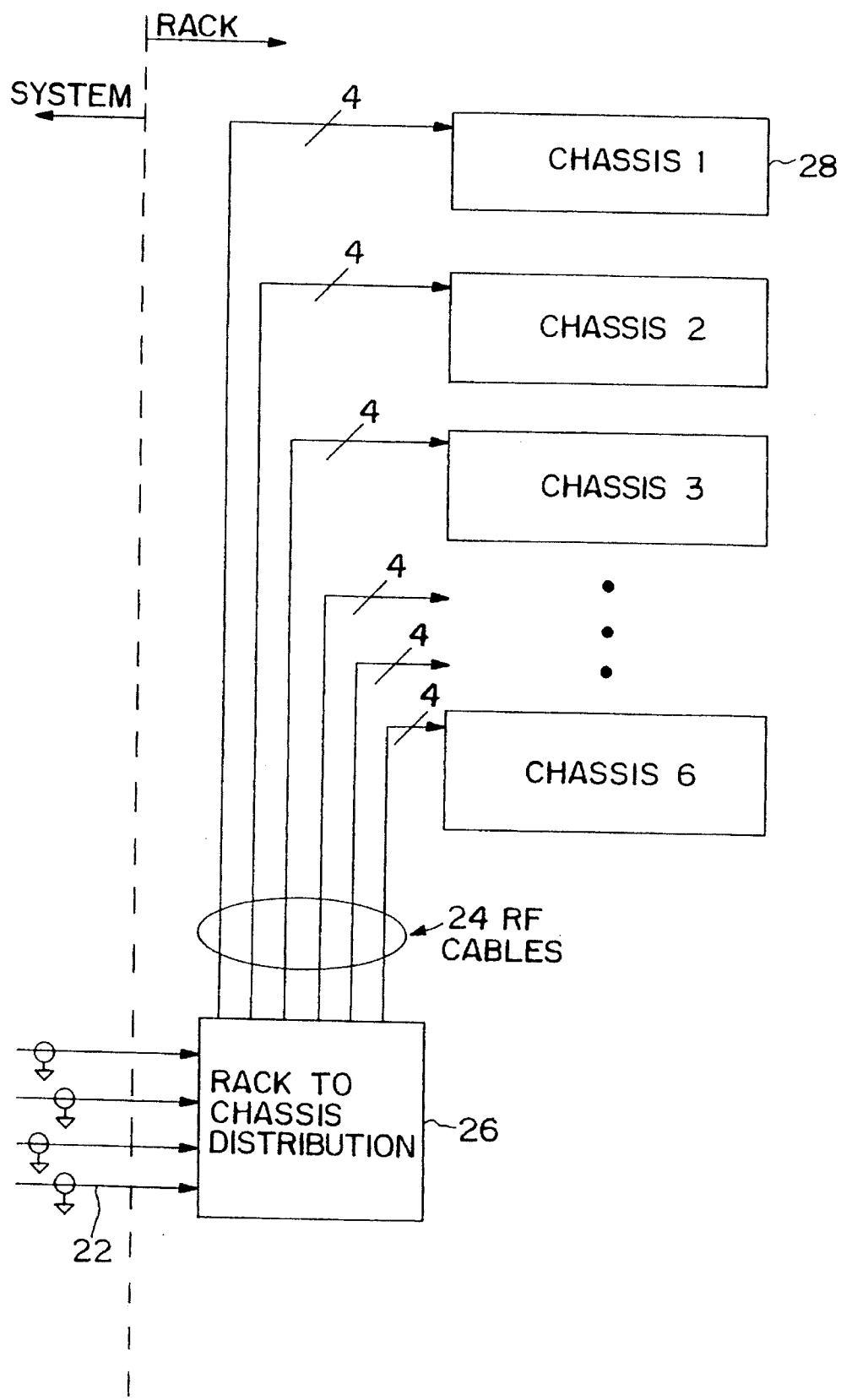
FIG. 3 is a partial functional block diagram of another embodiment of an RF signal distribution system of the present invention.

With reference to FIG. 3, in which like numerals have been used on similar elements as used in FIG. 2, another embodiment of the present invention may be provided with four RF signals 22. The RF signals 22 are provided to a rack-to-chassis distribution device 26 which splits the incoming signals into as many signals as are needed to separately supply each chassis 28 (six sets of signals in the exemplary system of FIG. 3).

Figure 4:
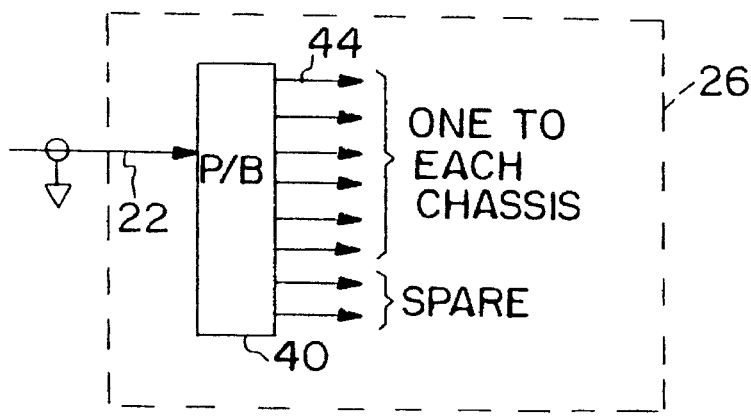
FIG. 4 is a functional block diagram of a portion of a rack-to-chassis distribution device which may be used in a system of the present invention.

With reference to FIG. 4, the rack-to-distribution device 26 of FIGS. 2 and 3 may include conventional plural power splitters 40, one splitter connected to each of the incoming RF signals. The power splitter 40 divides the incoming RF signal 22 into plural copies 44 of the signal for further distribution to the chassis 28. As depicted in the device 26 of FIG. 4, the power splitter 40 may be a conventional RF signal splitting device as are readily available commercially and which split the incoming signal into eight copies of the incoming signal. In such a circumstance, any unused output ports of the power splitter 40 can be tied off or used as spares.

Figure 5:
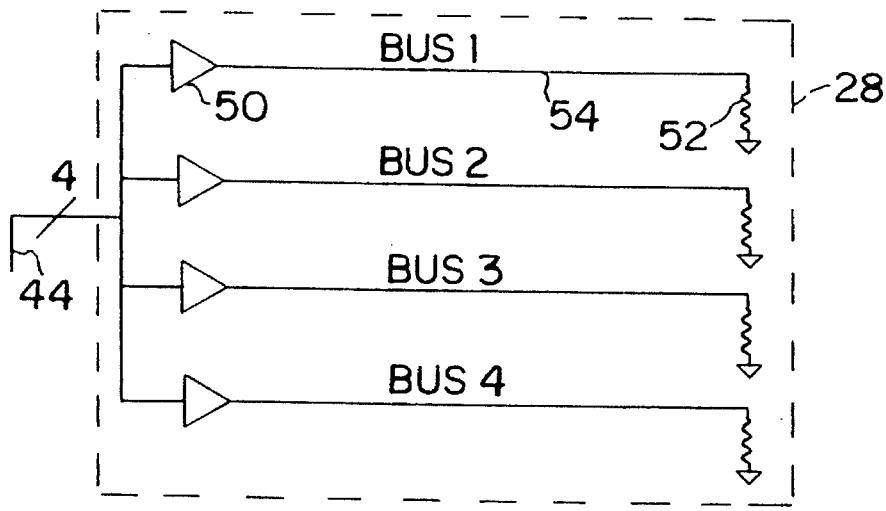
FIG. 5 is a functional block diagram of a portion of a chassis which may be used in a system in accordance with the present invention.

With reference now to FIG. 5, the copied RF signals 44 arriving at a chassis 28 may be distributed within the chassis 28 as a stripline on a printed circuit board which runs the length of the chassis in which receiver boards 30 (not shown) may be present. For example, each of the copied RF signals 44 may be connected to and amplified by an amplifier 50 whose output is in the form of a stripline or bus 54 across the back of the chassis 28. Thus, the RF signals are bussed to each of the receiver boards. To reduce reflections from the end of the bus, the bus may be terminated by a low impedance 52 such as a 10 to 50 ohm resistance into a ground plane. In operation, when an RF signal is present on the incoming RF signal lines 22, a copy of that signal will be available on the corresponding bus of each chassis 28. Of course, the bus 54 is not limited to a backplane circuit board as illustrated in FIG. 5 and may be along the top or bottom portions of the chassis 28 or may occupy only a portion of the panel of the chassis on which it resides. While a stripline on a printed circuit board provides a form of a bus which is easy to use, the invention is not so limited and other means of distributing the RF signal for ready attachment to the receiver boards may be used, such as coaxial cable which is interrupted on a regular basis for engagement with a mating portion of the receiver boards.

In a typical receiver configuration using the present invention, the RF signal which is presented to the rack has been amplified by the antenna and the RF-to-IF electronics. Such a signal generally has a signal strength sufficiently high that small variations in the bus (i.e., a few dB degradation) caused by the connections disclosed herein do not adversely affect system performance to a substantial degree.

Figure 6:
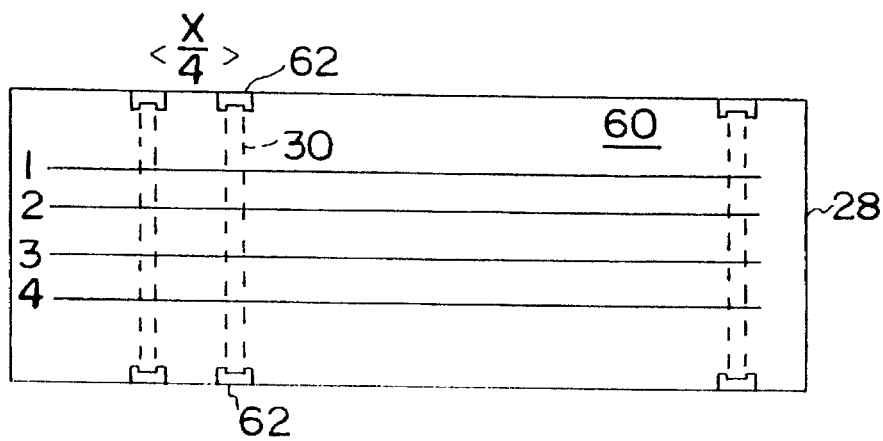
FIG. 6 is a representational pictorial diagram of a chassis which may be used in a system in accordance with the present invention.

The receiver boards 30 of the present invention may be formed for ready engagement with, attachment to and removal from the chassis. In a preferred embodiment, the stripline/bus 54 may appear on a surface of a printed circuit board 60 which functions as a conventional mother board, i.e., the mother board provides both mechanical and electrical connection to a daughter board 30 which is mounted perpendicularly thereto. In the preferred embodiment illustrated in FIGS. 5 and 6, the motherboard 60 is at the back of the chassis 28 and engages with receiver boards 30 which may be slide into mating position with the mother board 60. The receiver boards 30 are guided by guide channels 62 which guide the receiver boards into the positions on the motherboard 60 at which mating is obtained. Mating between the motherboard and the receiver board 30 may be accomplished using conventional electrical connectors for the non-RF signals and conventional RF jack and plug connectors for each of the RF signals. Typically, the RF connectors would include a coaxial center pin surrounded by a metal sheath on one connector and a cooperating center jack and mating metal sheath on the other connector. Such connectors may be readily used on the RF signals of the present invention because they typically present a low impedance when connected and a very low capacitance to the RF signal when unconnected. Thus, slots on the motherboard which are unconnected to receiver boards 30 will have a low capacitance unconnected connector which will minimize signal distortion on the associated bus.

The inventor has found that distortion of the bussed RF signals is minimized when the receiver boards are placed from adjoining receiver boards by a distance of approximately one-quarter of the wavelength of the RF signals being carried on the bus. In this configuration, the quarter-wave distance between receiver boards 30 serves as an isolation device, isolating other receiver boards 30 from the effects of the other receiver boards attached to the motherboard 60. The system of the present invention has been found to have a bandwidth of approximately 25% of the RF signal being bussed.

Figure 7:
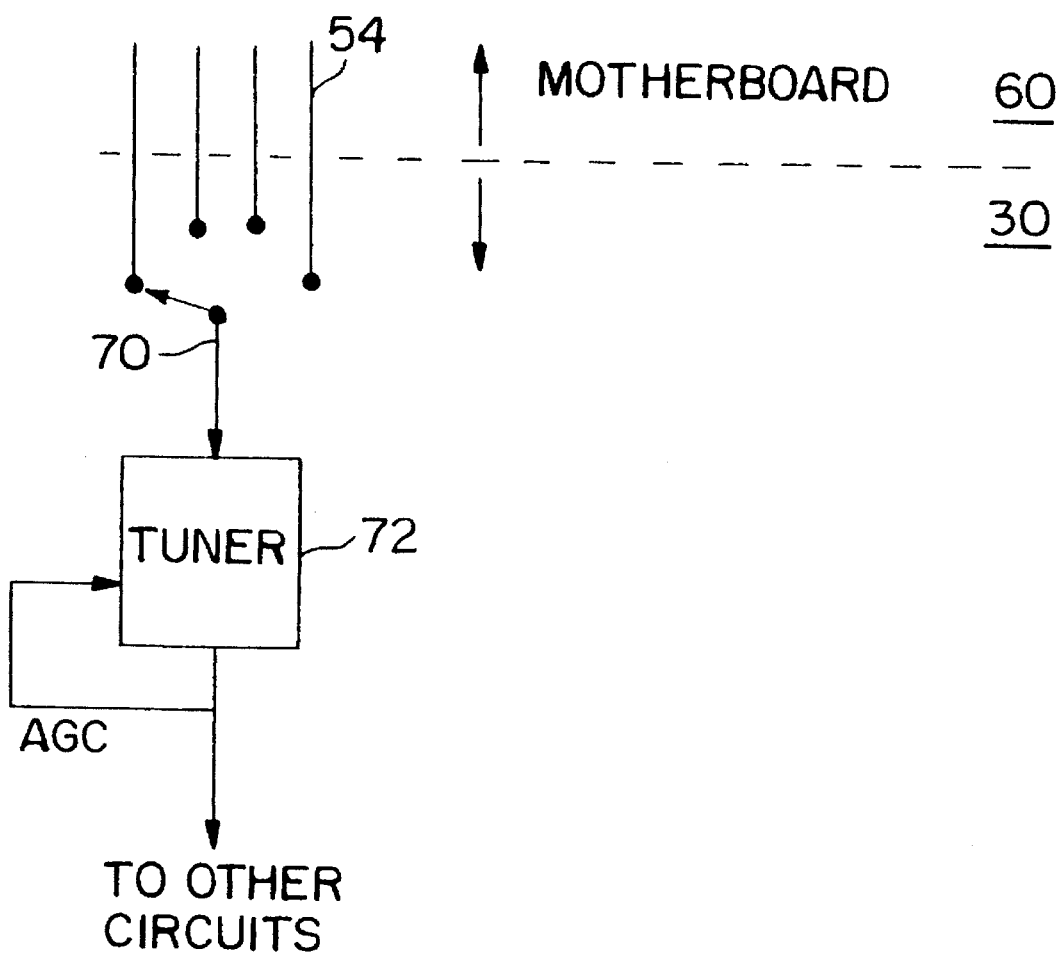
FIG. 7 is a functional block diagram of a circuit to interface the copies of an RF signal along a bus of a chassis to a receiver board in accordance with the present invention.

To connect the receiver circuit elements on the receiver circuit board to the RF signals, a conventional multilayer printed circuit board may be used. In such boards, each RF layer is isolated from other RF layers to avoid mutual RF signal interference and to protect the signals from outside electromagnetic interference. Connections between the RF signal conductors within the receiver boards and RF signal connectors (connected to the bus), a high impedance switch 70 such as illustrated in FIG. 7. The high impedance switch 70 selectively ties one of the RF signal busses of the chassis to the receiver board 30 and may include an Automatic Gain Control ("AGC") tuner to demodulate (or otherwise decode) the selected RF signal.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. An RF signal distribution system for simultaneously providing plural RF signals to plural RF receivers, comprising:

means for receiving M number of RF signals;

means for generating N copies of each of said RF signals;

means for providing only one copy of each RF signal to each of N interface boards, wherein each of said interface boards comprises M electrical bus circuits and each electrical bus circuit is provided with a copy of only one of said RF signals;

plural receiver boards, each receiver board being detachably electrically connected to one of said interface boards and having one or more RF paths for electrical connection to one or more of said electrical bus circuits.

2. The system of claim 1 wherein said bus circuit comprises a stripline circuit.

3. The system of claim 2 wherein said stripline circuit is terminated by a low impedance means.

4. The system of claim 1 further comprising means to space each of said receiver boards a predetermined distance from adjacent receiver boards.

5. The system of claim 4 wherein said predetermined distance is approximately one-quarter of the wavelength of the RF signals carried by said bus circuits.

6. The system of claim 1 wherein said means for electrically connecting comprises a connector having a central signal carrying portion and a coaxial sheathing portion.

7. The system of claim 1 wherein said RF paths comprise plural RF layers, each layer electromagnetically shielded from others of such layers.

8. The system of claim 7 wherein said electromagnetic shielding comprises one of a layer of metal interposed between said RF layers and a layer of isolating material interposed between said RF layers.

9. An RF signal distribution system for distributing plural RF signals to plural RF signal using circuits comprising:

plural RF signal using circuits;

a distribution device which generates plural copies of a set of RF signals provided to said distribution device;

plural chassis, each of said chassis carrying plural of said RF signal using circuits and comprising plural RF busses, each of said busses having an RF connector for providing removable electrical connection with one of said RF signal using circuits;

plural sets of RF carriers, each set of RF carriers exclusively providing one copy of said set of RF signals to one of said chassis;

so that one and only one set of RF signals is distributed to each chassis and provided substantially simultaneously to each of said RF signal using circuits carried by said chassis.

10. The system of claim 9 wherein each of said busses has plural RF connectors for removably electrically connecting to plural of said RF signal using circuits.

11. The system of claim 9 wherein one or more of said RF signal using circuits is simultaneously electrically connected to plural of said busses.

12. The system of claim 9 wherein said RF carriers comprise coaxial cable.

13. The system of claim 9 wherein said bus comprises a stripline circuit.

14. The system of claim 13 wherein said stripline circuit is attached to a printed circuit board.

15. The system of claim 13 wherein said RF connectors provide both electrical and physical connection between said RF signal using circuit and said chassis.

16. The system of claim 13 wherein said stripline circuit is substantially uninterrupted along portions of the stripline circuit which interconnect with said RF signal using circuits.

17. In a system for distributing plural RF signals to a set of plural receivers connected to one of a plural number of interface boards carried by a rack, the improvement comprising the use of a separate electrical bus to carry each one of said RF signals to the set of said plural receivers so that one and only one set of RF signals is distributed to the set of plural receivers on an interface board.

18. The system of claim 17 wherein said bus comprises a stripline.

19. The system of claim 18 wherein plural of said receivers are electrically connected to said bus.

20. The system of claim 19 wherein said receiver is electrically connected to plural busses.

* * * * *